US010419141B2

(12) United States Patent
Cui et al.

(10) Patent No.: US 10,419,141 B2
(45) Date of Patent: Sep. 17, 2019

(54) ESTIMATING VOLUME OF SWITCHING AMONG TELEVISION PROGRAMS FOR AN AUDIENCE MEASUREMENT PANEL

(71) Applicant: The Nielsen Company (US), LLC, New York, NY (US)

(72) Inventors: Jingsong Cui, Pennington, NJ (US); XiaoTing Liang, Hoboken, NJ (US); Scott John Sereday, Rochelle Park, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/799,660

(22) Filed: Oct. 31, 2017

(65) Prior Publication Data

US 2018/0167153 A1 Jun. 14, 2018

Related U.S. Application Data

(60) Provisional application No. 62/432,332, filed on Dec. 9, 2016.

(51) Int. Cl.
*H04N 7/16* (2011.01)
*H04H 60/31* (2008.01)
(Continued)

(52) U.S. Cl.
CPC ............ *H04H 60/31* (2013.01); *H04H 60/44* (2013.01); *H04H 60/63* (2013.01); *H04H 60/66* (2013.01);
(Continued)

(58) Field of Classification Search
CPC ........... H04N 21/252; H04N 21/44222; H04N 21/25866; H04N 21/4332
(Continued)

(56) References Cited

U.S. PATENT DOCUMENTS 6,286,140 B1 9/2001 Ivanyi
6,405,370 B1 6/2002 Jarrell
(Continued)

FOREIGN PATENT DOCUMENTS

WO 2007035264 3/2007

OTHER PUBLICATIONS

Qiu et al., "Modeling Channel Popularity Dynamics in a Large IPTV System," SIGMETRICS/Performance, Jun. 15-19, 2009, 12 pages.
Siddarth et al., "To Zap or Not to Zap: A Study of the Determinants of Channel Switching During Commercials," Marketing Science, vol. 17, No. 2, 1998, pp. 124-138.

*Primary Examiner* — Jivka A Rabovianski
(74) *Attorney, Agent, or Firm* — Hanley, Flight & Zimmerman, LLC

(57) ABSTRACT

Examples disclosed herein to estimate volume of switching (VoS) among television programs include determining, based on panelist program viewing data, a first VoS value representing a portion of a decreased amount of tuning by matched panelists to a first program from first to second measurement periods to attribute to an increased amount of tuning by the matched panelists to a second program from the first to second measurement periods; estimating, based on the program viewing data and first VoS value, a second VoS value representing a portion of a decreased amount of tuning by unmatched panelists to the first program from the first to second measurement periods to attribute to an increased amount of tuning by the unmatched panelists to the second program from the first to second measurement periods; and combining the first and second VoS values to determine a third VoS value for a combination of the matched and unmatched panelists.

11 Claims, 6 Drawing Sheets

(51) Int. Cl.
*H04H 60/66* (2008.01)
*H04N 21/258* (2011.01)
*H04N 21/658* (2011.01)
*H04H 60/63* (2008.01)
*H04N 21/438* (2011.01)
*H04H 60/44* (2008.01)

(52) U.S. Cl.
CPC ..... *H04N 21/258* (2013.01); *H04N 21/25866* (2013.01); *H04N 21/4383* (2013.01); *H04N 21/658* (2013.01); *H04N 21/6582* (2013.01)

(58) Field of Classification Search
USPC .................................. 725/9, 10, 13, 14, 46
See application file for complete search history.

(56) References Cited

U.S. PATENT DOCUMENTS

| | | |
|---|---|---|
| 7,139,723 B2 | 11/2006 | Conkwright et al. |
| 8,266,644 B2 | 9/2012 | Randolph et al. |
| 8,607,262 B2 | 12/2013 | Hallberg |
| 2002/0199193 A1* | 12/2002 | Gogoi ................ H04N 5/44543 725/46 |
| 2007/0124756 A1 | 5/2007 | Covell et al. |
| 2013/0227611 A9 | 8/2013 | Grauch et al. |

\* cited by examiner

ESTIMATING VOLUME OF SWITCHING AMONG TELEVISION PROGRAMS FOR AN AUDIENCE MEASUREMENT PANEL

RELATED APPLICATION(S)

This patent claims the benefit of and priority to U.S. Provisional Application Ser. No. 62/432,332, entitled "ESTIMATING VOLUME OF SWITCHING AMONG TELEVISION PROGRAMS FOR AN AUDIENCE MEASUREMENT PANEL" and filed on Dec. 9, 2016. U.S. Provisional Application Ser. No. 62/432,332 is hereby incorporated by reference in its entirety.

FIELD OF THE DISCLOSURE

This disclosure relates generally to audience measurement and, more particularly, to estimating volume of switching among television programs for an audience measurement panel.

BACKGROUND

A goal of television (TV) program volume of switching (VoS) analysis is to measure and represent the dynamic changes in TV program tuning activity between two measurement periods using person-level, or panelist-level, viewing data obtained for an audience measurement panel. In a VoS analysis, each increase (or decrease) in a panelist's program viewing is attributed to corresponding decreases (or increases) in viewing of other program(s) and/or partaking in other activity. VoS analysis can provide media content providers with insights into viewer behavior, such as who is watching their programs, what are the competing programs, how does a given program perform over time, etc.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
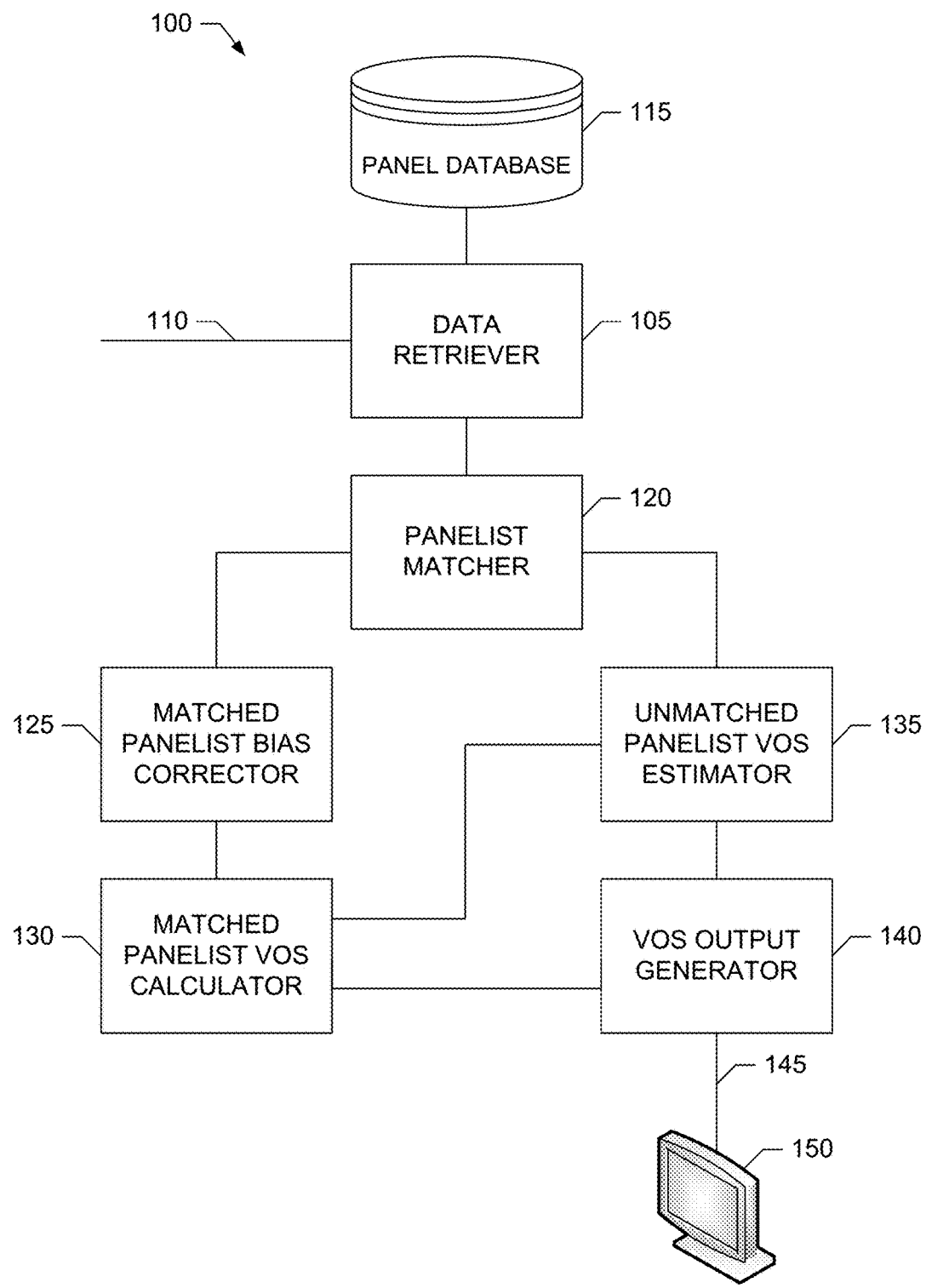
FIG. 1 is a block diagram of an example television program volume of switching estimator implemented in accordance with the teachings of this disclosure.

Example methods, apparatus, systems and articles of manufacture (e.g., non-transitory physical storage media) to estimate volume of switching among television programs for an audience measurement panel are disclosed herein. Example methods disclosed herein to estimate volume of switching among television programs include determining, based on accessed panelist program viewing data, a first volume of switching value representing a portion of a decreased amount of tuning by matched panelists to a first program measured from a first measurement period to a second measurement period to attribute to an increased amount of tuning by the matched panelists to a second television program measured from the first measurement period to the second measurement period. Disclosed example methods also include estimating, based on the accessed panelist program viewing data and the first volume of switching value, a second volume of switching value representing a portion of a decreased amount of tuning by unmatched panelists to the first television program measured from the first measurement period to the second measurement period to attribute to an increased amount of tuning by unmatched panelists to the second television program measured from the first measurement period to the second measurement period. Disclosed example methods further include combining the first volume of switching value and the second volume of switching value to determine a third volume of switching value corresponding to a combination of the matched panelists and the unmatched panelists.

In some disclosed examples, the matched panelists correspond to a first group of panelists represented in the program viewing data for both the first and second measurement time periods. In some disclosed examples, the unmatched panelists correspond to a second group of panelists not represented in the program viewing data for at least one of the first or second measurement time periods, Additionally or alternatively, some disclosed example methods further include outputting a volume of switching matrix including the third volume of switching value to represent a portion of a decreased amount of tuning by the combination of matched and unmatched panelists to the first television program from the first measurement period to the second measurement period to attribute to an increased amount of tuning by the combination of the matched and unmatched panelists to the second television program from the first measurement period to the second measurement period.

Additionally or alternatively, in some disclosed example methods, the estimating of the second volume of switching value includes (1) determining, based on the accessed panelist program viewing data, a first matched tuning value representing an amount of tuning by the matched panelists to the first program in the first measurement period, (2) determining, based on the accessed panelist program viewing data, a second matched tuning value representing an amount of tuning by the matched panelists to the second program in the first measurement period, (3) determining, based on the accessed panelist program viewing data, a first unmatched tuning value representing an amount of tuning by the unmatched panelists to the first program in the first measurement period (4) determining, based on the accessed panelist program viewing data, a second unmatched tuning value representing an amount of tuning by the unmatched panelists to the second program in the first measurement period, and (5) determining the second volume of switching value based on the first volume of switching value, the first matched tuning value, the second matched tuning value, the first unmatched tuning value and the second unmatched tuning value. In some such disclosed example methods, the determining of the second volume of switching value based on the first volume of switching value, the first matched tuning value, the second matched tuning value, the first unmatched tuning value and the second unmatched tuning value includes determining a scale factor based on (i) a first ratio of the first unmatched tuning value to the first matched tuning value and (ii) a second ratio of the second unmatched tuning value to the second matched tuning value, and multiplying the first volume of switching value by the scale factor to determine the second volume of switching value. Furthermore, in some such disclosed example methods, the determining of the scale factor further includes determining a square root of the first ratio multiplied by the second ratio.

Additionally or alternatively, in some such disclosed example methods, the estimating of the second volume of switching value further includes solving for the second volume of switching value based on (i) the result of the multiplying of the first volume of switching value by the scale factor, (ii) a first constraint that a first sum of volume of switching values representing tuning by the unmatched panelists from respective ones of a first set of programs, including the first program, in the first measurement period to the second program in the second measurement period equals the second unmatched tuning value, and (iii) a second constraint that a second sum of volume of switching values representing tuning by the unmatched panelists from the first program in the first measurement period to respective ones of a second set of programs, including the second program, in the second measurement period equals the first unmatched tuning value.

These and other example methods, apparatus, systems and articles of manufacture (e.g., non-transitory physical storage media) to estimate volume of switching among television programs for an audience measurement panel are disclosed in greater detail below.

As mentioned above, goal of television (TV) program volume of switching (VoS) analysis is to measure and represent the dynamic changes in TV program tuning activity between two measurement periods using person-level, or panelist-level, viewing data obtained for an audience measurement panel. In a VoS analysis, each increase (or decrease) in a panelist's program viewing is attributed to corresponding decreases (or increases) in viewing of other program(s) and/or partaking in other activity. VoS analysis can provide media content providers with insights into viewer behavior, such as who is watching their programs, what are the competing programs, how does a given program perform over time, etc.

Prior VoS analysis techniques are limited to using panelist viewing data only for matching panelists who are represented in the panelist viewing data for most, or all, of the two measurement periods of interest. In other words, prior VoS analysis techniques exclude panelists associated with incomplete panelist viewing data from the VoS analysis. In the context of VoS analysis, incomplete panelist viewing data generally occurs in one of two ways: (1) a matched panelist, who is represented in the panelist viewing data for the two measurement periods of interest, was included in the panel for just a portion of one or both of the measurement periods, or (2) an unmatched panelist is represented in the panelist viewing data for just one of the two measurement periods of interest.

Unlike such prior techniques, example VoS analysis techniques disclosed herein are able to utilize incomplete panelist viewing data in the VoS analysis. For example, for incomplete panelist viewing data associated with a matched panelist having missing data from one or both of the measurement periods, example VoS analysis techniques disclosed herein perform bias correction to account for the portion of missing data for the matched panelist. For panelist viewing data associated with unmatched panelists who are missing from one of the measurement periods, example VoS analysis techniques disclosed herein estimate the VoS values associated with such unmatched panelists based on a combination of the VoS values determined for matched panelists and the available panelist viewing data for the unmatched panelists. As such, example VoS analysis techniques disclosed herein improve VoS estimates by including panelists who are in the audience measurement panel for just a portion of the two measurement periods of interest.

Turning to the figures, a block diagram of an example TV program VoS estimator 100 implemented in accordance with the teachings of this disclosure is illustrated in FIG. 1. The example VoS estimator 100 includes an example data retriever 105 to obtain example input data 110 defining the scope of the VoS analysis to be performed by the VoS estimator 100. The example data retriever 105 also accesses an example panelist database 115 to obtain (e.g., retrieve) panelist data (e.g., such as panelist viewing data including tuning/viewing minutes) for each of the two measurement periods of the VoS analysis.

The example VoS estimator 100 further includes an example panelist matcher 120 to match panelists represented in the panelist data for both the first and second measurement periods to determine matched panelists and unmatched panelists for the VoS analysis being performed. In examples disclosed herein, a matched panelist is a panelist represented in the program viewing data for both the first and second measurement time periods. In examples disclosed herein, an unmatched panelist is a panelist not represented in the program viewing data for at least one of the first or second measurement time periods. In some examples, the VoS estimator 100 considers a panelist to be represented in the program viewing data for a given measurement period when the program viewing data includes valid data for the panelist over at least a threshold percentage of the given measurement period. As disclosed in further detail below, the threshold percentage is referred to as a unification threshold.

The example VoS estimator 100 includes an example matched panelist bias corrector 125 to correct for biases resulting from missing panelist data for the matched panelists identified by the panelist matcher 120, and an example matched panelist VoS calculator 130 to calculate the VoS values representing the program switching performed by the matched panelists individually and aggregated. The example VoS estimator 100 further includes an example unmatched panelist VoS estimator 135 to estimate VoS values representing the program switching performed by unmatched panelists (e.g., in the aggregate), who are panelists identified by the panelist matcher 120 as missing from either the first measurement period or the second measurement period. As disclosed in further detail below, the unmatched panelist VoS estimator 135 of the illustrated example estimates the VoS values associated with such unmatched panelists based on a combination of the VoS values determined by the matched panelist VoS calculator 130 for matched panelists, and the available panelist data for the unmatched panelists.

The example VoS estimator 100 also includes an example VoS output generator 140 to combine the VoS values for the matched panelists and the unmatched panelists to calculate total VoS values representing the program switching performed by the group of matched and unmatched panelists (e.g., in the aggregate). The VoS output generator 140 of the illustrated example also provides an example output 145 representing the results of the VoS analysis. In some examples, the output 145 is in a form capable of being presented via an example output device 150. In the illustrated example, the output device 150 can be implemented by any output device, such as one or more the example output devices 624 included in the example processor platform 600 of FIG. 6, which is described in further detail below.

Figure 2:
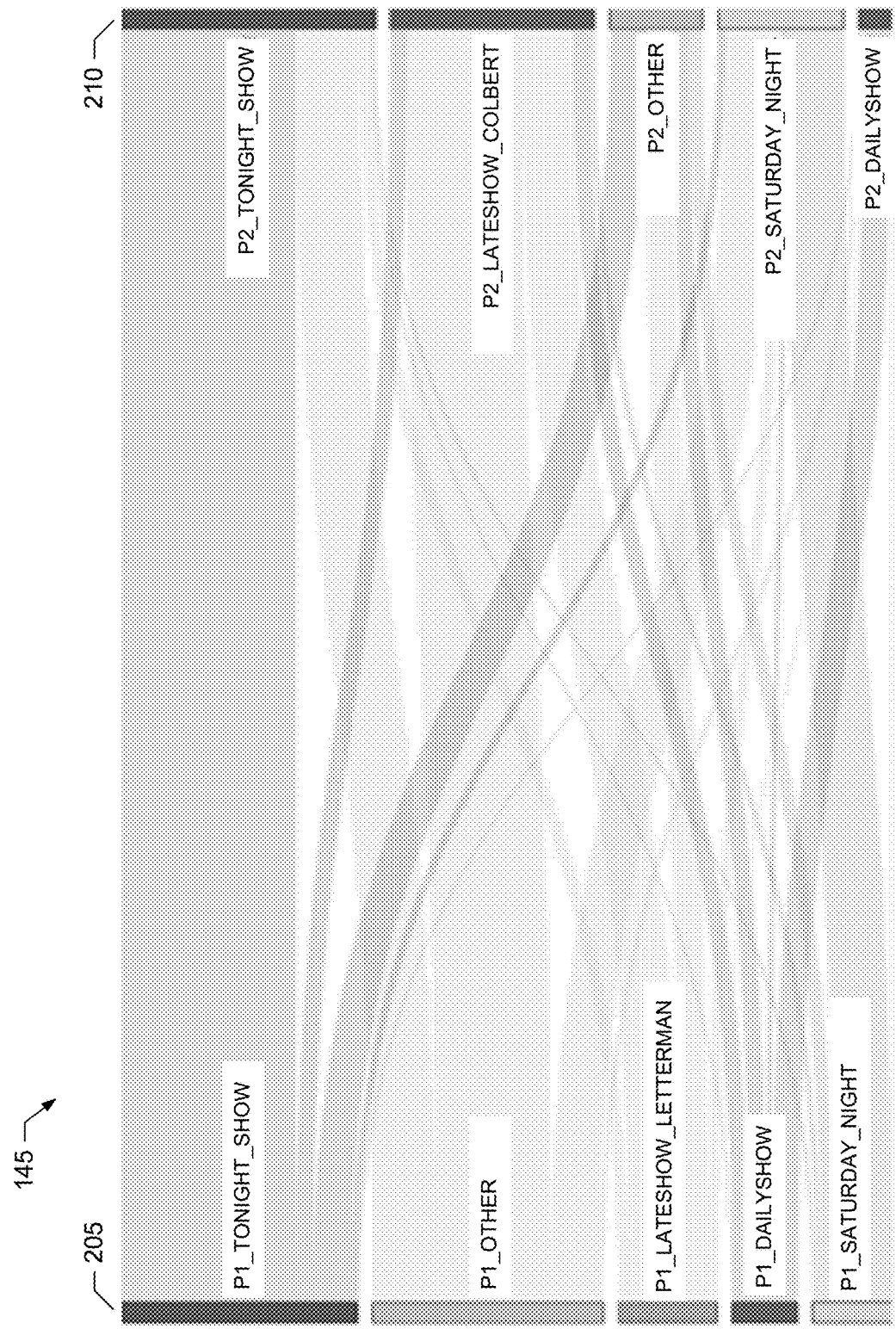
FIG. 2 illustrates an example output generated by the example television program volume of switching estimator of FIG. 1.

An example output 145 provided by the VoS estimator 100 for a VoS analysis is illustrated in FIG. 2. The example VoS output 200 is a Sankey diagram representing the dynamic changes in TV program tuning activity between two example measurement periods 205 and 210 as determined by the VoS estimator 100. As shown in FIG. 2, in a VoS analysis, each increase (or decrease) in overall panelist tuning (e.g., viewing) of a given program is attributed to corresponding decreases (or increases) in tuning (e.g., viewing) of other program(s) and/or partaking in other activity.

Returning to the illustrated example of FIG. 1, the example panelist database 115 of the VoS estimator 100 includes demographic information, such as age, gender, location, income, education, etc., associated with panelists of statistically selected panelist monitoring sites (e.g., households) included in an audience measurement panel, such as a national people meter panel managed by The Nielsen Company (US), LLC. The panelist database 115 of the illustrated example also includes panelist measurement data obtained from audience measurement meters monitoring the statistically selected panelist monitoring sites (e.g., households). Such panelist measurement data includes, for example, panelist level viewing data identifying the television programs presented (e.g., tuned) at the statistically selected panelist monitoring sites and their respective durations of presentation. For example, the panelist database 115 can include All-Minute Respondent Level Data (AMRLD) obtained from monitoring the national people meter panel managed by The Nielsen Company (US), LLC. Additionally or alternatively, in some examples, the panelist database 115 includes census measurement data typically obtained from a much larger audience than the panelist measurement data, such as via set-top box return path data corresponding to subscribers of one or more cable service providers, satellite service providers, etc. Such census measurement data includes, for example, respondent level viewing data identifying the television programs presented at each reporting site and their respective durations of presentation, but without demographic information associated with the respondents. In the illustrated example, the panelist database 115 further includes details concerning the programs that are potentially available at the statistically selected panelist monitoring sites, such as program and episode identification information, program durations, etc.

To determine which panelist data, such as the panelist viewing data, to access for a VoS analysis, the data retriever 105 of the illustrated example accepts several types of example input data 110. In the illustrated example, the input data 110 can be provided via any input device, such as one or more the example input devices 622 included in the example processor platform 600 of FIG. 6, which is described in further detail below. For example, the data retriever 105 accepts input data 110 specifying the programs (and/or networks) that are to be the subject of the VoS analysis. In some examples, it is recommended to visualize 6 or fewer programs in each measurement period (with the number of programs included in each period being the same or different). Also, some or all of the specified programs can be the same or different across the two measurement periods. However, in some examples, it is recommended to select programs having similar durations in the different periods because, in some such examples, switching is measured in raw minutes (or some other granularity) rather than average minutes watched and selecting programs with similar durations may make interpretation of the analysis easier.

The input data 110 of the illustrated example also specifies the two measurement periods that are to be the subject of the VoS analysis. In some examples, for each of the two measurement periods, durations of at least 60 days are recommended. This is because too small of a measurement period may produce less reliable switching values, lower carry-over values (corresponding to staying on the same program) and higher switching values to the default "Other" category. The example input data 110 further specifies the gap between the two measurement periods. In some examples, it is recommended to select measurement periods with a relatively small gap between them. This is because too large of a gap and/or too large of a measurement period may result in fewer panelists that are 100% unified, which may result in more unmatched panelists and/or more matched panelists with missing data, which will need to be adjusted, as disclosed in further detail below, before inclusion in the VoS analysis.

The input data 110 of the illustrated example also specifies a threshold for the unification rule to be used for the VoS analysis. Unification refers to the percentage of a measurement period that a panelist has valid panelist data. For example, a panelist is considered 100% unified for a measurement period if the panelist has valid panelist data over the entire period. The unification threshold specifies a lower unification limit to be met to consider a panelist as being included in a given measurement period. In some examples, the default unification threshold is 75%.

As mentioned above, the example VoS estimator 100 includes the example matched panelist bias corrector 125 to correct for biases resulting from missing panelist data for the matched panelists identified by the panelist matcher 120. As noted above, a matched panelist is a panelist represented in the program viewing data for both the first and second measurement time periods. In some examples, the matched panelist bias corrector 125 removes matched panelists who do not meet the unification threshold (e.g., 75%) in both measurement periods. The matched panelist bias corrector 125 of the illustrated example also applies an adjustment factor to ensure each matched panelist has equal weights for each period. In some examples, this adjustment factor is applied according to Equations 1 and 2.

$$\text{Adjusted\_Person\_Program\_Minutes\_Period\_X} = \text{Adjustment\_Factor} * \text{Actual\_Person\_Program\_Minutes\_Period\_X} \quad \text{Equation 1}$$

$$\text{Adjustment\_Factor} = \frac{\min(\text{Person\_Days\_In\_Tab\_Period\_X}, \text{Person\_Days\_In\_Tab\_Period\_Y})}{\text{Person\_Days\_In\_Tab\_Period\_X}} \quad \text{Equation 2}$$

In Equations 1 and 2, the variable X refers to the measurement period with the higher unification percentage for the given matched panelist, and the variable Y refers to the measurement period with the lower unification percentage for the given matched panelist. Thus, according to Equation 2, the adjustment factor (corresponding to Adjustment_Factor) for a matched panelist is determined to be the smaller of the percentages of time the matched panelist has valid data over each one of the two measurement periods (corresponding to min (Person_Days_In_Tab_Period_X, Person_Days_In_Tab_Period_Y)) divided by the larger of the percentages of time the matched panelists has valid data over each one of the two measurement periods (corresponding to Person_Days_In_Tab_Period_X). Then, the amount of viewing for the matched panelist during the measurement period with the larger percentage of valid data (corresponding to Actual_Person_Program_Minutes_Period_X) is scaled by the determined adjustment factor according to Equation 1. For example, a matched panelist with unification percentages of 100% in period 2 and 90% in period 1 will have all period 2 minutes multiplied by 90% to ensure equal weighting in both periods.

In some examples, the percentage of switching between programs remains fairly consistent as the unification percentages and number of days in the measurement period (e.g., days-in-tab) increase. However, as these values get smaller, the tuning minutes assigned to or from the default "Other" category may increase, whereas the "Carryover" minutes decrease. "Carryover" refers to switching between the same program (or, in other words, remaining with the same program), whereas "Other" refers to switching between a program and a non-program or some other activity (e.g., a program not specified in the VoS analysis, some other media exposure, no media exposure, etc.).

As mentioned above, the example VoS estimator 100 includes the example matched panelist VoS calculator 130 to calculate the VoS values representing the program switching performed by the matched panelists individually and aggregated. The matched panelist VoS calculator 130 of the illustrated example calculates gains, losses, and volumes of switching (e.g., in tuning/viewing minutes) between each pair of programs between the two measurement periods. The following is an example VoS calculation algorithm implemented by the matched panelist VoS calculator 130. The example algorithm is described from the perspective of calculating VoS values for an example matched panelist (referred to as panelist 1).

First, the example matched panelist VoS calculator 130 accesses the panelist data retrieved by the data retriever 105 to determine the program viewing minutes for panelist 1 and for the specified programs and specified measurement periods. For example, assume the program viewing minutes determined for panelist 1 in period 1 are given by Table 1.

TABLE 1

| ## | person_id | program_id | minutes |
|---|---|---|---|
| ## 1: | 1 | 1 | 20 |
| ## 2: | 1 | 3 | 10 |
| ## 3: | 1 | 4 | 10 |

Assume the program viewing minutes determined for panelist 1 in period 2 are given by Table 2

TABLE 2

| ## | person_id | program_id | minutes |
|---|---|---|---|
| ## 1: | 1 | 1 | 10 |
| ## 2: | 1 | 2 | 10 |
| ## 3: | 1 | 4 | 15 |

In Tables 1 and 2, the column labeled "person_id" includes the person identifier for the given panelists, the column labeled "program_id" includes the program identifiers for the different programs tuned to by the panelist identified by the corresponding person identifier, and the column "minutes" includes the amount of time the given panelist identified by the corresponding person identifier tuned to the given program identified by the corresponding program identifier.

Next, the example matched panelist VoS calculator 130 calculates the carryover, and increase and/or decrease in program viewing minutes for each program from the first measurement period (P1) to the second measurement period (P2). For example, for program i, the matched panelist VoS calculator 130 calculates Equations 3-5.

$$\text{Carryover}_i = \min(P1_i, P2_i) \qquad \text{Equation 3}$$

$$\text{Increase}_i = \max(P2_i - P1_i, 0) \qquad \text{Equation 4}$$

$$\text{Decrease}_i = \max(P1_i - P2_i, 0) \qquad \text{Equation 5}$$

where:
$P1_i$: Program i's viewing in measurement period 1;
$P2_i$: Program i's viewing in measurement period 2.

An example of calculating the carryover and increase/decrease viewing minutes for panelist 1 using the data of Tables 1 and 2 is given in Table 3:

TABLE 3

| ## | program_id | mins1 | mins2 | carryover | increase | decrease | totincrease |
|---|---|---|---|---|---|---|---|
| ## 1: | 0 | 0 | 5 | 0 | 5 | 0 | 20 |
| ## 2: | 1 | 20 | 10 | 10 | 0 | 10 | 20 |
| ## 3: | 2 | 0 | 10 | 0 | 10 | 0 | 20 |
| ## 4: | 3 | 10 | 0 | 0 | 0 | 10 | 20 |
| ## 5: | 4 | 10 | 15 | 10 | 5 | 0 | 20 |

In Table 3, the column labeled "program_id" includes the program identifiers for the different programs tuned to by panelist 1, the column labeled "mins1" includes the amount of time during the first measurement period that panelist 1 tuned to the given program identified by the corresponding program identifier, the column labeled "mins2" includes the amount of time during the second measurement period that panelist 1 tuned to the given program identified by the corresponding program identifier, the column labeled "carryover" includes the carryover amount of tuning from the first measurement period to the second measurement period determined according to Equation 3 for the given program identified by the corresponding program identifier, the column labeled "increase" includes the increase in amount of tuning from the first measurement period to the second measurement period determined according to Equation 4 for the given program identified by the corresponding program identifier, the column labeled "decrease" includes the decrease in amount of tuning from the first measurement period to the second measurement period determined according to Equation 5 for the given program identified by the corresponding program identifier, and the column labeled "totincrease" includes the sum of the increased amount of tuning values listed in the column labeled "increase."

Based on Table 3, the example matched panelist VoS calculator 130 determined that panelist 1, for example, spent 20 minutes in period 1 and 10 minutes in period 2 watching program 1 (program_id 1). Thus, from period 1 to period 2, panelist 1 spent less time (10 minutes less) watching program 1, with just 10 minutes being a carryover from the same program, program 1, watched in the prior period 1. The other 10 minutes went to other programs person 1 watched in period 2.

Next, the example matched panelist VoS calculator 130 calculates the VoS values for panelist 1, also referred to as the switching volumes for panelist 1. Switching occurs when a panelist spent more time watching program i in period 1 and less time on watching program j in period 2, or vice versa. The matched panelist VoS calculator 130 of the illustrated example calculates VoS values $s_{i,j}$ for program i in period 1 and program j in period 2 according to Equation 6:

$$s_{i,j} = \frac{Increase_j}{\sum_{k=1}^{K} Increase_k} * Decrease_i \quad \text{Equation 6}$$

The VoS value $s_{i,j}$ of Equation 6 represents the portion of the decrease in the program viewing minutes of program i in period 1 (corresponding to the variable $Decrease_i$) to be attributed to the increase in the program viewing minutes of program j in period 2 (corresponding to the variable $Increase_j$).

The matched panelist VoS calculator 130 of the illustrated example also utilizes a virtual program (referred to as program 0) as a catch-all to represent the difference in total viewing minutes between the two measurement periods. In the preceding example, panelist 1 spent 40 minutes watching three programs in period 1 and 35 minutes watching three programs in period 2. Thus, panelist 1's total viewing minutes decreased by 5 minutes in period 2 relative to period 1, which the matched panelist VoS calculator 130 assigns to program 0, which also corresponds to an "Other TV and non-TV" bucket.

An example of calculating the VoS value $s_{i,j}$ for panelist 1 and program 1 in period 1 using the data of Table 3 is given in Table 4:

TABLE 4

| ## | program_id_p1 | program_id_p2 | decrease | increase | SumOfIncrease | proportion | volume |
|---|---|---|---|---|---|---|---|
| ## 1: | 1 | 0 | 10 | 5 | 20 | 0.25 | 2.5 |
| ## 2: | 1 | 1 | 10 | 0 | 20 | 0.00 | 10.0 |
| ## 3: | 1 | 2 | 10 | 10 | 20 | 0.50 | 5.0 |
| ## 4: | 1 | 3 | 10 | 0 | 20 | 0.00 | 0.0 |
| ## 5: | 1 | 4 | 10 | 5 | 20 | 0.25 | 2.5 |

In Table 4, each row corresponds to a possible switching combination of tuning by panelist 1 from the program labeled by the identifier "program_id_p1" during the first measurement period to the program labeled by the identifier "program_id_p2" during the first measurement period. In Table 4, the column labeled "decrease" corresponds to the value of $Decrease_i$ from Equation 6 corresponding to the given possible switching combination represented by the given row, the column labeled "increase" corresponds to the value of $Increase_j$ from Equation 6 corresponding to the given possible switching combination represented by the given row, the column labeled "SumOfIncrease" corresponds to the value of $\sum_{k=1}^{K} Increase_k$ from Equation 6 corresponding to the given possible switching combination represented by the given row, the column labeled "proportion" corresponds to the value of $Increase_j / \sum_{k=1}^{K} Increase_k$ from Equation 6 corresponding to the given possible switching combination represented by the given row, and the column labeled "volume" corresponds to the resulting VoS value of $s_{i,j}$ from Equation 6 corresponding to the given possible switching combination represented by the given row.

The example matched panelist VoS calculator 130 then tabulates an example switching matrix for panelist 1 for the different combinations of switching from program i in measurement period 1 to program j in measurement period 2. An example switching matrix tabulated by the matched panelist VoS calculator 130 of the illustrated example for panelist 1 using the data of Tables 1-3 and Equation 6 is given in Table 5:

TABLE 5

| ## | program_id_p1 | program_id_p2 | volume |
|---|---|---|---|
| ## 1: | 1 | 0 | 2.5 |
| ## 2: | 1 | 1 | 10.0 |
| ## 3: | 1 | 2 | 5.0 |
| ## 4: | 1 | 4 | 2.5 |
| ## 5: | 3 | 0 | 2.5 |
| ## 6: | 3 | 2 | 5.0 |
| ## 7: | 3 | 4 | 2.5 |
| ## 8: | 4 | 4 | 10.0 |

Finally, the example matched panelist VoS calculator 130 aggregates (e.g., sums) the corresponding VoS value $s_{i,j}$ for each matched panelist and for each pair of programs to determine aggregate VoS values for the matched panelists. The result is a set of VoS values representing a portion of a decreased amount of tuning by matched panelists to a first program, i, measured from a first measurement period (e.g., period 1) to a second measurement period (e.g., period 2) to attribute to an increased amount of tuning by the matched panelists to a second television program, j, measured from the first measurement period (e.g., period 1) to the second measurement period (e.g., period 2).

As mentioned above, the example VoS estimator 100 includes the example unmatched panelist VoS estimator 135 to estimate VoS values representing the program switching performed by unmatched panelists (e.g., in the aggregate), who are panelists identified by the panelist matcher 120 as missing from either the first measurement period or the second measurement period. Unmatched panelists have viewing data in only one of two measurement periods. Therefore, switching cannot be calculated for unmatched panelists in the same manner described above as for matched panelists. Nevertheless, unmatched panelists viewing data can be used by the example unmatched panelist VoS estimator 135 to estimate switching volumes for unmatched panelists over the two measurement periods.

An example algorithm implemented by the unmatched panelist VoS estimator 135 to estimate VoS values for unmatched panelists is given in Table 6:

TABLE 6

1. For matched panelists, calculate:
   Total minutes by program by measurement period
   VoS for each pair of programs
2. For unmatched panelists, calculate:
   Total minutes by program by measurement period
   VoS is not available - this is what is being estimated
3. Estimate proportion-based estimates for VoS for unmatched panelists
4. Optimize the VoS estimates for unmatched panelists with constraints based upon total minutes
5. Calculate total VoS by aggregating (e.g., summing) actual VoS for matched panelists and optimized VoS for unmatched panelists In the following disclosure, the following variables are used:

$s_{i,j}^k$: Minutes switched from tuning to program i (in period 1) to tuning to program j (in period 2) by a matched panelist k.

$s_{i,j}$: VoS from tuning to program i (in period 1) to tuning to program j (in period 2) over a set of panelists. For example:

$$s_{i,j}^{matched} = \sum_{k=1}^{K} s_{i,j}^k \qquad \text{Equation 7}$$

$v_{i,.}^{matched}$, $v_{.,j}^{matched}$: total tuning minutes by matched panelists for program i in period 1 and for program j in period 2, respectively $v_{i,.}^{unmatched}$, $v_{.,j}^{unmatched}$: total tuning minutes by unmatched panelists for program i in period 1 and for program j in period 2, respectively.

In some examples, the unmatched panelist VoS estimator 135 determines example proportion-based VoS estimates for unmatched panelists, $s_{i,j}^{prop}$, according to Equation 8:

$$s_{i,j}^{prop} = s_{i,j}^{matched} * \sqrt{\frac{v_{i,.}^{unmatched}}{v_{i,.}^{matched}} * \frac{v_{.,j}^{unmatched}}{v_{.,j}^{matched}}} \qquad \text{Equation 8}$$

Thus, according to Equation 8, the unmatched panelist VoS estimator 135 estimates a given proportion-based VoS value, $s_{i,j}^{prop}$ by (1) determining, based on the accessed panelist program viewing data 115, a first matched tuning value (e.g., $v_{i,.}^{matched}$) representing an amount of tuning by the matched panelists to the first program in the first measurement period, (2) determining, based on the accessed panelist program viewing data 115, a second matched tuning value (e.g., $v_{.,j}^{matched}$) representing an amount of tuning by the matched panelists to the second program in the first measurement period, (3) determining, based on the accessed panelist program viewing data 115, a first unmatched tuning value (e.g., $v_{i,.}^{unmatched}$) representing an amount of tuning by the unmatched panelists to the first program in the first measurement period, (4) determining, based on the accessed panelist program viewing data 115, a second unmatched tuning value (e.g., $v_{.,j}^{unmatched}$) representing an amount of tuning by the unmatched panelists to the second program in the first measurement period, and (5) determining the second volume of switching value based on a volume of switching value for matched panelists (e.g., $s_{i,j}^{matched}$), the first matched tuning value, the second matched tuning value, the first unmatched tuning value and the second unmatched tuning value. In the example of Equation 8, the unmatched panelist VoS estimator 135 determines the second volume of switching value based on the first volume of switching value, the first matched tuning value, the second matched tuning value, the first unmatched tuning value and the second unmatched tuning value by (A) determining a scale factor (e.g., corresponding to the term on the right side of the multiplication symbol in Equation 8) based on (i) a first ratio (e.g., $v_{i,.}^{unmatched}/v_{i,.}^{matched}$) of the first unmatched tuning value to the first matched tuning value and (ii) a second ratio (e.g., $v_{.,j}^{unmatched}/v_{.,j}^{matched}$) of the second unmatched tuning value to the second matched tuning value, and (B) multiplying the volume of switching value for matched panelists (e.g. $s_{i,j}^{matched}$) by the scale factor to determine the volume of switching value for unmatched panelists (e.g., $s_{i,j}^{unmatched}$). Furthermore, the unmatched panelist VoS estimator 135 determines the scale factor by determine a square root of the first ratio multiplied by the second ratio.

The result of Equation 8 is a set of proportion-based VoS values, $s_{i,j}^{prop}$, representing a portion of a decreased amount of tuning by unmatched panelists to a first program, i, measured from a first measurement period (e.g., period 1) to a second measurement period (e.g., period 2) to attribute to an increased amount of tuning by the unmatched panelists to a second television program, j, measured from the first measurement period (e.g., period 1) to the second measurement period (e.g., period 2). With this approach, the unmatched panelist VoS estimator 135 uses the volume of switching determined for matched panelists, but adjusted by the total viewing minutes of unmatched panelists in both measurement periods, to estimate the volume of switching for the unmatched panelists.

In some examples, the unmatched panelist VoS estimator 135 implements an example balanced approach to estimate VoS values for unmatched panelists, $s_{i,j}^{balanced}$. With the proportion-based approach, the relative size of switching volumes from the matched panelists is maintained, but rescaled to account for the total viewing minutes of unmatched panelists. However, a potential issue with proportion-based switching volumes estimate is that they may not add up to the actual viewing minutes in the two periods. In other words, the following properties hold for matched panelists:

$$\sum_{j=1}^{J} s_{i,j} = v_{i,.} \qquad \text{Equation 9}$$

$$\sum_{i=1}^{I} s_{i,j} = v_{.,j} \qquad \text{Equation 10}$$

However, using the proportion-based approach, similar properties may not hold for the unmatched panelists. This may lead to possible inconsistency in the ratings of individuals programs.

In some examples, the unmatched panelist VoS estimator 135 implements the balanced approach as given in Table 7:

TABLE 7

1. Apply proportion based method to estimate volume of switching without forcing the total of the estimated program minutes to add up to the known actual minutes.
2. Calculate the difference between true and estimated viewing minutes and assign the difference to the "Other TV and non-TV" bucket (e.g., program 0)
    If the revised "Other TV and non-TV" bucket becomes negative, all other buckets for the programs in that period are proportionally adjusted to add up to total actual viewing minutes
    The balanced VoS estimates for other buckets are the same as estimated values calculated by the proportion-based method The result is a set of balanced VoS values, $s_{i,j}^{balanced}$ representing a portion of a decreased amount of tuning by unmatched panelists to a first program, i, measured from a first measurement period (e.g., period 1) to a second measurement period (e.g., period 2) to attribute to an increased amount of tuning by the unmatched panelists to a second television program, j, measured from the first measurement period (e.g., period 1) to the second measurement period (e.g., period 2).

In some examples, the unmatched panelist VoS estimator 135 implements an example non-linear optimization with constraint algorithm to estimate VoS values for unmatched panelists, $s_{i,j}^{optimized}$. This optimization method combines the benefits of both the proportion method (e.g., consistent pattern in switching volumes) and the balanced method (e.g., consistent total tuning/viewing minutes). To achieve these dual goals, the optimization algorithm minimally adjusts $s_{i,j}^{prop}$ with a constraint that the new estimated VoS values add up to total tuning minutes at the program level in both periods for unmatched panelists.

To calculate the optimization-based switching minutes, $s_{i,j}^{optimized}$, the unmatched panelist VoS estimator 135 of the illustrated example uses the optimization function of Equation 11:

$$\min \sum_{i=1}^{I} \sum_{j=1}^{J} |s_{i,j}^{optimized} - s_{i,j}^{prop}| \quad \text{Equation 11}$$

with the constraints that, for each program in each period, the VoS should add up to the total tuning/viewing minutes. Mathematically, these constraints are given by Equations 12 and 13:

$$\text{For } i = 1 \text{ to } I, \sum_{j=1}^{J} s_{i,j}^{optimized} = v_{i,\cdot}^{unmatched} \quad \text{Equation 12}$$

$$\text{For } j = 1 \text{ to } J, \sum_{i=1}^{I} s_{i,j}^{optimized} = v_{\cdot,j}^{unmatched} \quad \text{Equation 13}$$

Thus, according to Equations 11-13, the unmatched panelist VoS estimator 135 estimates a given VoS value, $s_{i,j}^{optimized}$, based on (i) $s_{i,j}^{prop}$, which is the result of multiplying the volume of switching value for matched panelists by the scale factor according to Equation 8, (ii) a first constraint (e.g., from Equation 12) that a first sum of volume of switching values (e.g., $\Sigma_{j=1}^{J} s_{i,j}^{optimized}$) representing tuning by the unmatched panelists from respective ones of a first set of programs in the first measurement period to the second program in the second measurement period equals the unmatched tuning value $v_{i,\cdot}^{unmatched}$, and (iii) a second constraint (e.g., from Equation 13) that a second sum of volume of switching values (e.g., $\Sigma_{i=1}^{I} s_{i,j}^{optimized}$) representing tuning by the unmatched panelists from the first program in the first measurement period to respective ones of a second set of programs, including the second program, in the second measurement period equals the unmatched tuning value $v_{\cdot,j}^{unmatched}$. The result is a set of optimized VoS values, $s_{i,j}^{optimized}$, representing a portion of a decreased amount of tuning by unmatched panelists to a first program, i, measured from a first measurement period (e.g., period 1) to a second measurement period (e.g., period 2) to attribute to an increased amount of tuning by the unmatched panelists to a second television program, j, measured from the first measurement period (e.g., period 1) to the second measurement period (e.g., period 2).

In some examples, the unmatched panelist VoS estimator 135 implements an example collapse algorithm to estimate VoS for unmatched panelists, $s_{i,j}^{collapse}$. In the example collapse algorithm, the unmatched panelist VoS estimator 135 treats all unmatched panelist viewing data as being associated with a virtual panelist, sums the viewing minutes for this virtual panelist, and then applies the example algorithms described above for matched panelists to calculate the switching volumes, $s_{i,j}^{collapse}$, for this virtual panelist. The result is a set of collapsed VoS values, $s_{i,j}^{collapse}$, representing a portion of a decreased amount of tuning by unmatched panelists to a first program, i, measured from a first measurement period (e.g., period 1) to a second measurement period (e.g., period 2) to attribute to an increased amount of tuning by the unmatched panelists to a second television program, j, measured from the first measurement period (e.g., period 1) to the second measurement period (e.g., period 2).

In some examples, the unmatched panelist VoS estimator 135 implements an example interaction algorithm to estimate VoS for unmatched panelists, $s_{i,j}^{interaction}$. In some such examples, the unmatched panelist VoS estimator 135 determines the VoS estimate for unmatched panelists, $s_{i,j}^{interaction}$, according to Equations 14-17:

$$s_{i,j}^{interaction} = s_{i,j}^{matched} * \frac{\frac{v_{i,\cdot}^{unmatched}}{v_{i,\cdot}^{matched}} * \frac{v_{\cdot,j}^{unmatched}}{v_{\cdot,j}^{matched}}}{\frac{v_{\cdot,\cdot}^{unmatched}}{v_{\cdot,\cdot}^{matched}}} \quad \text{Equation 14}$$

$$\text{For } i = 1 \text{ to } I, \sum_{j=1}^{J} s_{i,j} = v_{i,\cdot} \quad \text{Equation 15}$$

$$\text{For } j = 1 \text{ to } J, \sum_{i=1}^{I} s_{i,j} = v_{\cdot,j} \quad \text{Equation 16}$$

For persons j=1 to J in period 1, i=1 to I in period 2 and programs k=1 to K:

$$\sum_{k=1}^{K}\sum_{i=1}^{I}s_{i,j,k} + \sum_{k=1}^{K}\sum_{j=1}^{J}s_{i,j,k} = v_{.,.,.}$$ Equation 17

The result is a set of interaction VoS values, $s_{i,j}^{interaction}$, representing a portion of a decreased amount of tuning by unmatched panelists to a first program, i, measured from a first measurement period (e.g., period 1) to a second measurement period (e.g., period 2) to attribute to an increased amount of tuning by the unmatched panelists to a second television program, j, measured from the first measurement period (e.g., period 1) to the second measurement period (e.g., period 2).

In some examples, the unmatched panelist VoS estimator 135 implements an average of the VoS estimates determined for unmatched panelists using the example interaction algorithm and the example proportion-based algorithms disclosed above. For example, the unmatched panelist VoS estimator 135 can determine such a VoS estimate according to Equation 18:

$$s_{i,j}^{avginterprop} = \frac{s_{i,j}^{prop} + s_{i,j}^{interaction}}{2}$$ Equation 18

The result is a set of VoS values, $s_{i,j}^{avginterprop}$, representing a portion of a decreased amount of tuning by unmatched panelists to a first program, i, measured from a first measurement period (e.g., period 1) to a second measurement period (e.g., period 2) to attribute to an increased amount of tuning by the unmatched panelists to a second television program, j, measured from the first measurement period (e.g., period 1) to the second measurement period (e.g., period 2).

While an example manner of implementing the VoS estimator 100 is illustrated in FIG. 1, one or more of the elements, processes and/or devices illustrated in FIG. 1 may be combined, divided, re-arranged, omitted, eliminated and/or implemented in any other way. Further, the example data retriever 105, the example panelist database 115, the example panelist matcher 120, the example matched panelist bias corrector 125, the example matched panelist VoS calculator 130, the example unmatched panelist VoS estimator 135, the example VoS output generator 140, the example output device 150 and/or, more generally, the example VoS estimator 100 of FIG. 1 may be implemented by hardware, software, firmware and/or any combination of hardware, software and/or firmware. Thus, for example, any of the example data retriever 105, the example panelist database 115, the example panelist matcher 120, the example matched panelist bias corrector 125, the example matched panelist VoS calculator 130, the example unmatched panelist VoS estimator 135, the example VoS output generator 140, the example output device 150 and/or, more generally, the example VoS estimator 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example VoS estimator 100, the example data retriever 105, the example panelist database 115, the example panelist matcher 120, the example matched panelist bias corrector 125, the example matched panelist VoS calculator 130, the example unmatched panelist VoS estimator 135, the example VoS output generator 140 and/or the example output device 150 is/are hereby expressly defined to include a non-transitory computer readable storage device or storage disk such as a memory, a digital versatile disk (DVD), a compact disk (CD), a Blu-ray disk, etc. including the software and/or firmware. Further still, the example VoS estimator 100 may include one or more elements, processes and/or devices in addition to, or instead of, those illustrated in FIG. 1, and/or may include more than one of any or all of the illustrated elements, processes and devices.

Figure 3:
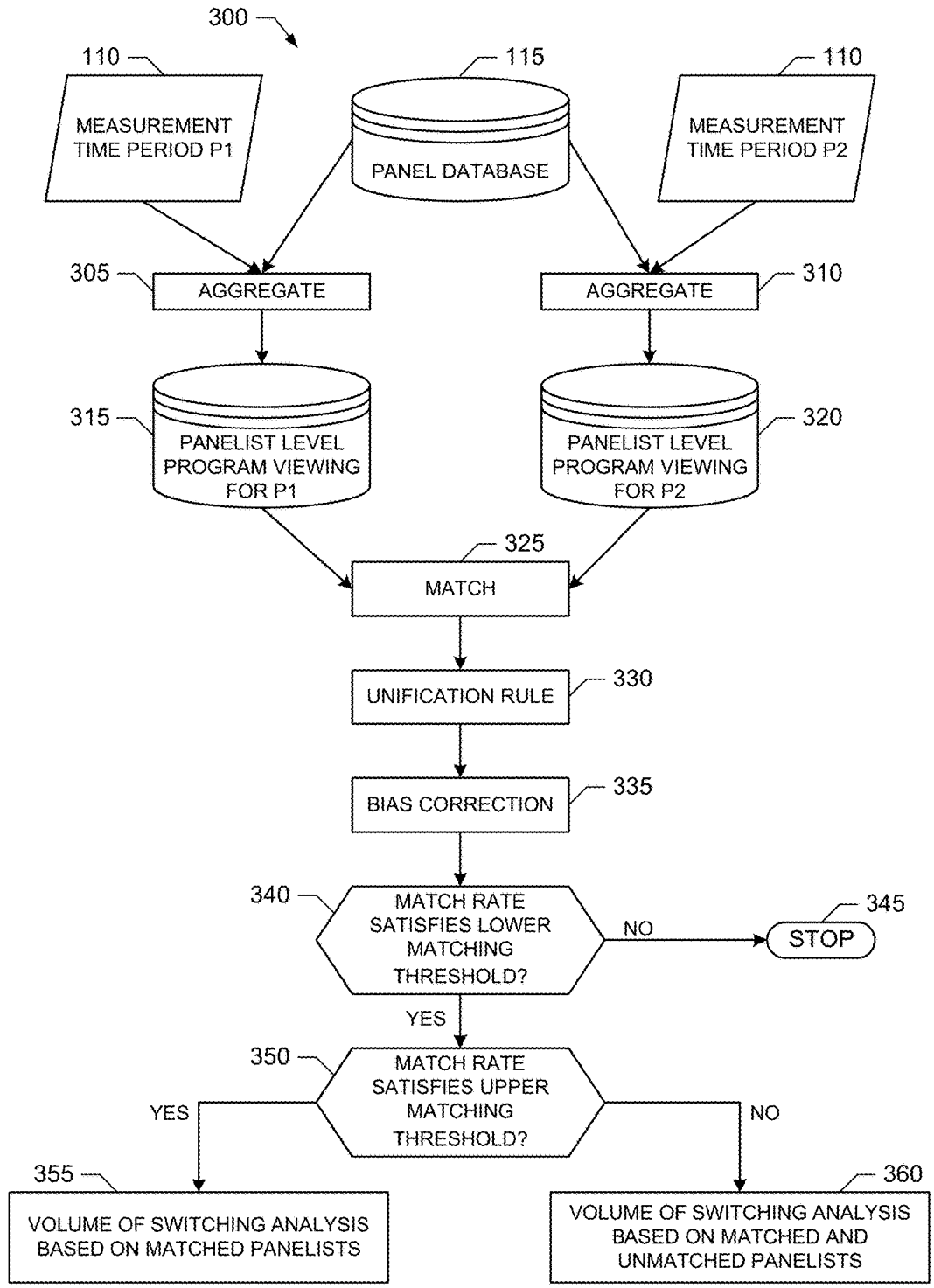
FIGS. 3-5 are flowcharts representative of example computer readable instructions that may be executed to implement the example television program volume of switching estimator of FIG. 1.
Figure 4:
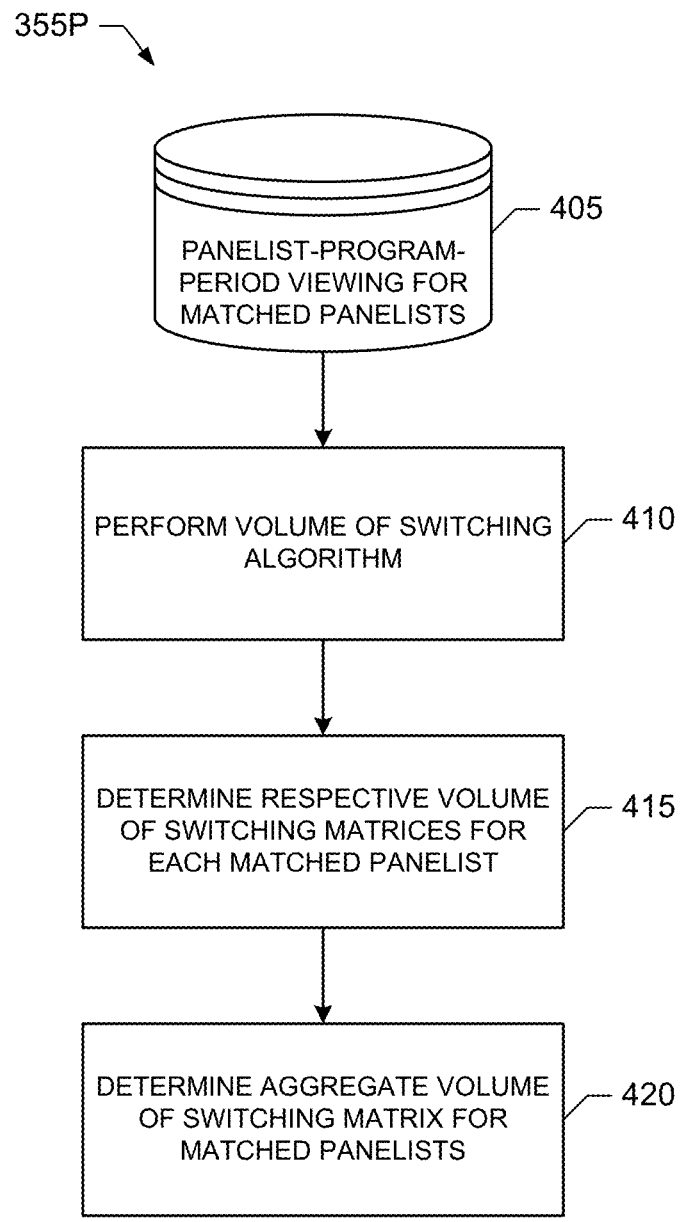
Figure 5:
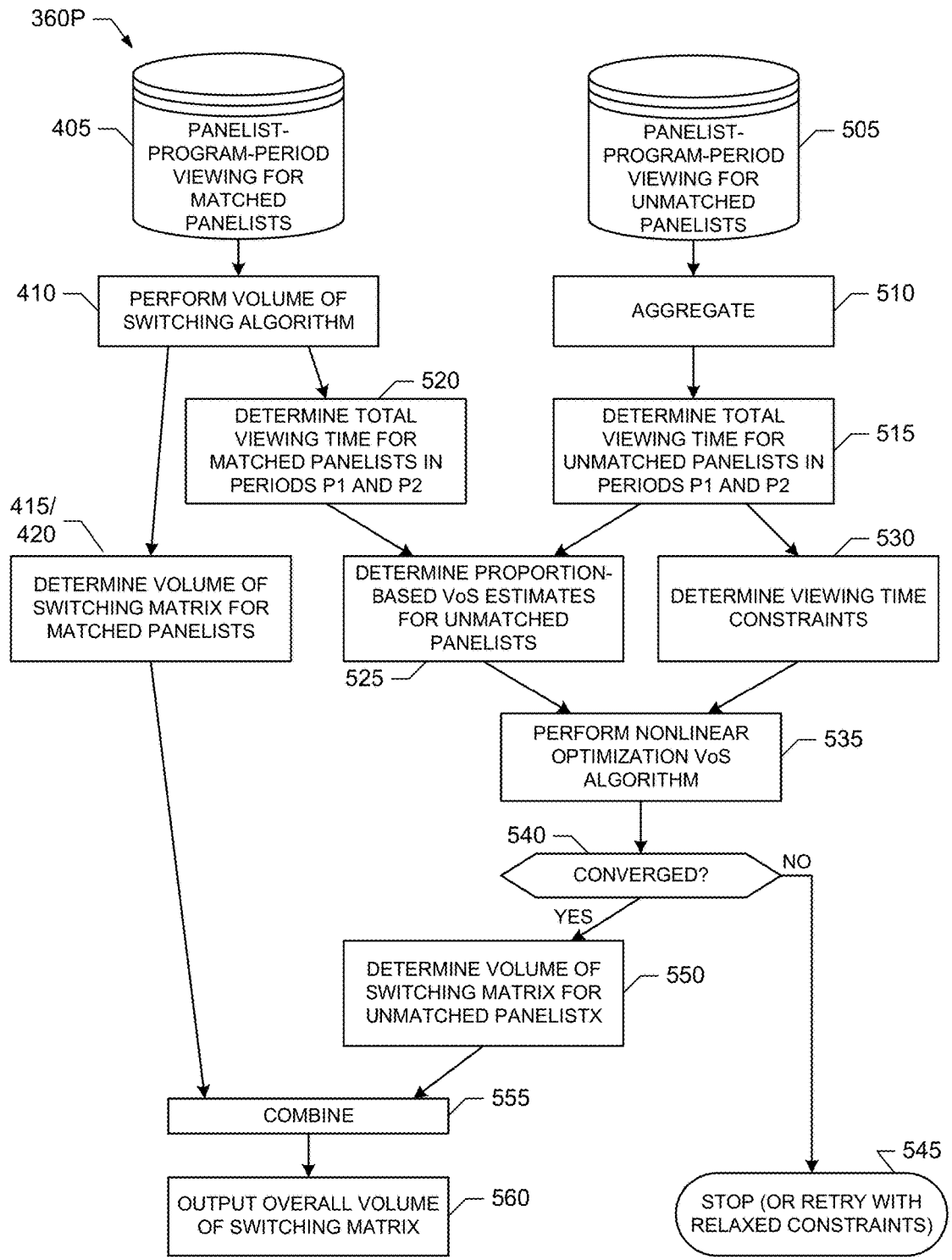

Flowcharts representative of example machine readable instructions for implementing the example VoS estimator 100, the example data retriever 105, the example panelist database 115, the example panelist matcher 120, the example matched panelist bias corrector 125, the example matched panelist VoS calculator 130, the example unmatched panelist VoS estimator 135, the example VoS output generator 140 and/or the example output device 150 are shown in FIGS. 3-5. In these examples, the machine readable instructions comprise one or more programs for execution by a processor, such as the processor 612 shown in the example processor platform 600 discussed below in connection with FIG. 6. The one or more programs, or portion(s) thereof, may be embodied in software stored on a non-transitory computer readable storage medium such as a CD-ROM, a floppy disk, a hard drive, a digital versatile disk (DVD), a Blu-ray disk™, or a memory associated with the processor 612, but the entire program or programs and/or portions thereof could alternatively be executed by a device other than the processor 612 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 3-5, many other methods of implementing the example VoS estimator 100, the example data retriever 105, the example panelist database 115, the example panelist matcher 120, the example matched panelist bias corrector 125, the example matched panelist VoS calculator 130, the example unmatched panelist VoS estimator 135, the example VoS output generator 140 and/or the example output device 150 may alternatively be used. For example, with reference to the flowcharts illustrated in FIGS. 3-5, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3-5 may be implemented using coded instructions (e.g., computer and/or machine readable instructions) stored on a non-transitory computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media. Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 300 that may be executed to implement the example VoS estimator 100 of FIG. 1 is represented by the flowchart shown in FIG. 3. With reference to the preceding figures and associated written descriptions, the example program 300 of FIG. 3 begins execution at blocks 305 and 310. At block 305, the example data retriever 105 accesses the example panelist database 115 based on input data 110 specifying the first measurement period (P1) to aggregate tuning/viewing minutes for each panelist and for each program specified by the input data 110 to be the subject of the VoS analysis for the first measurement period. The resulting tuning/viewing minutes 315 for the first measurement period are stored by the data retriever 105 in, for example, the panelist database 115. At block 310, the example data retriever 105 accesses the example panelist database 115 based on input data 110 specifying the second measurement period (P2) to aggregate tuning/viewing minutes for each panelist and for each program specified by the input data 110 to be the subject of the VoS analysis for the second measurement period. The resulting tuning/viewing minutes 320 for the second measurement period are stored by the data retriever 105 in, for example, the panelist database 115.

At block 325, the example panelist matcher 120 determines, as described above, matched panelists represented in the both the tuning/viewing minutes 315 for the first measurement period and the tuning/viewing minutes 320 for the second measurement period. At block 330, the example matched panelist bias corrector 125 removes matched panelists who do not meet the unification threshold (e.g., 75%) in both measurement periods, as described above. At block 335, the matched panelist bias corrector 125 performs bias correction, as described above. At block 340, the VoS estimator 100 determines whether the percentage of matching panelists satisfies a first (e.g., lower) matching threshold (e.g., 20% or some other value). If the percentage of matching panelists fails to satisfy the first matching threshold (block 340), execution of the example program stops (block 345). However, if the percentage of matching panelists satisfies the first matching threshold (block 340), at block 345, the VoS estimator 100 determines whether the percentage of matching panelists satisfies a second (e.g., upper) matching threshold (e.g., 90% or some other value). If the percentage of matching panelists satisfies the second matching threshold (block 350), at block 355, the VoS estimator 100 performs a VoS analysis based on just the tuning/viewing data for the matching panelists. An example program that may be executed to perform the processing at block 355 is illustrated in FIG. 4 and described in further detail below. However, if the percentage of matching panelists fails to satisfy the second matching threshold (block 350), at block 360, the VoS estimator 100 performs a VoS analysis based on the tuning/viewing data for the matching panelists and the tuning/viewing data for unmatched panelists. An example program that may be executed to perform the processing at block 360 is illustrated in FIG. 5 and described in further detail below.

An example program 355P that may be executed to perform the processing at block 355 of FIG. 3 is represented by the flowchart shown in FIG. 4. With reference to the preceding figures and associated written descriptions, the example program 355P of FIG. 4 begins execution at block 405 at which the example matched panelist VoS calculator 130 accesses tuning/viewing data for the matched panelists for the two measurement periods and the programs specified in the input data 420. At block 410, the matched panelist VoS calculator 130 calculates, as described above, the VoS value, $s_{i,j}$ for the matched panelists for switching between the different combinations (pairs) of programs i and j from the first measurement period to the second measurement period. At block 415, the matched panelist VoS calculator 130 tabulates the switching matrices for the matched panelists, as described above. At block 420, the example VoS output generator 140 tabulates an aggregate switching matrix including the aggregates matched panelist VoS values, $s_{i,j}^{matched}$ for the different combinations (pairs) of programs i and j from the first measurement period to the second measurement period. Execution of the example program 355P then ends. Additionally or alternatively, in some examples, at block 420, the VoS output generator 140 outputs a Sankey diagram (e.g., corresponding to an output such as the example VoS output 200 of FIG. 2) and/or other appropriate graphical output representing the aggregated matched panelist VoS values, $s_{i,j}^{matched}$, for the different combinations (pairs) of programs i and j from the first measurement period to the second measurement period.

An example program 360P that may be executed to perform the processing at block 360 of FIG. 3 is represented by the flowchart shown in FIG. 5. With reference to the preceding figures and associated written descriptions, the example program 360P of FIG. 4 begins by executing blocks 405, 410, 415 and 420 as described above with respect to FIG. 4, which results in the matched panelist VoS calculator 130 determining the switching matrix for the matched panelists, which contain the aggregate VoS value $s_{i,j}$ for the matched panelists for switching between the different combinations (pairs) of programs i and j from the first measurement period to the second measurement period. At blocks 505, 510 and 515, the example unmatched panelist VoS estimator 135 accesses tuning/viewing data for the unmatched panelists missing from one of the two measurement periods and for the programs specified in the input data 420, aggregates the tuning/viewing data, and determines the values for $v_{i,.}^{unmatched}$, $v_{.,j}^{unmatched}$, which are the total tuning minutes by unmatched panelists for each program i in period 1 and for each program j in period 2, respectively, as described above. At block 520, the unmatched panelist VoS estimator 135 determines the values for $v_{i,.}^{matched}$, $v_{.,j}^{matched}$ which are the total tuning minutes by matched panelists for each program i in period 1 and for each program j in period 2, respectively.

At block 525, the unmatched panelist VoS estimator 135 determines the example proportion-based VoS estimate for unmatched panelists, $s_{i,j}^{prop}$, as described above. At blocks 530 and 535, the unmatched panelist VoS estimator 135 performs the non-linear optimization with constraint algorithm to estimate VoS values for unmatched panelists, $s_{i,j}^{optimized}$, as described above. In some examples, if the non-linear optimization with constraint algorithm fails to converge (block 540), execution of the example program 360P stops (block 545). In some examples, further iterations of blocks 530 and 535 may be performed with relaxed constraints to provide more opportunities for the non-linear optimization with constraint algorithm to converge. In some such examples, if the non-linear optimization with constraint algorithm fails to converge after these further iterations (block 540), execution of the example program 360P then stops (block 545).

However, if the non-linear optimization with constraint algorithm converges (block 540), then at block 550, the unmatched panelist VoS estimator 135 tabulates an estimated switching matrix for the unmatched panelists, which contains the estimated VoS values for unmatched panelists, $s_{i,j}^{optimized}$, for the different combinations (pairs) of programs i and j from the first measurement period to the second measurement period. At block 560, the VoS output generator 140 combines (e.g., adds) the switching matrix determined at blocks 415 and 420 for the matched panelists and the estimated switching matrix determined at block 550 for the unmatched panelists. At block 565, the VoS output generator 140 outputs the resulting total switching matrix (e.g., in the form of a Sankey diagram, as described above). In some examples, the processing associated with blocks 530-545 is omitted and control proceeds from block 525 to block 550. In some examples, the processing associated with blocks 530-545 is modified to implement one or more of the other example techniques described above for estimating VoS for unmatched panelists.

Figure 6:
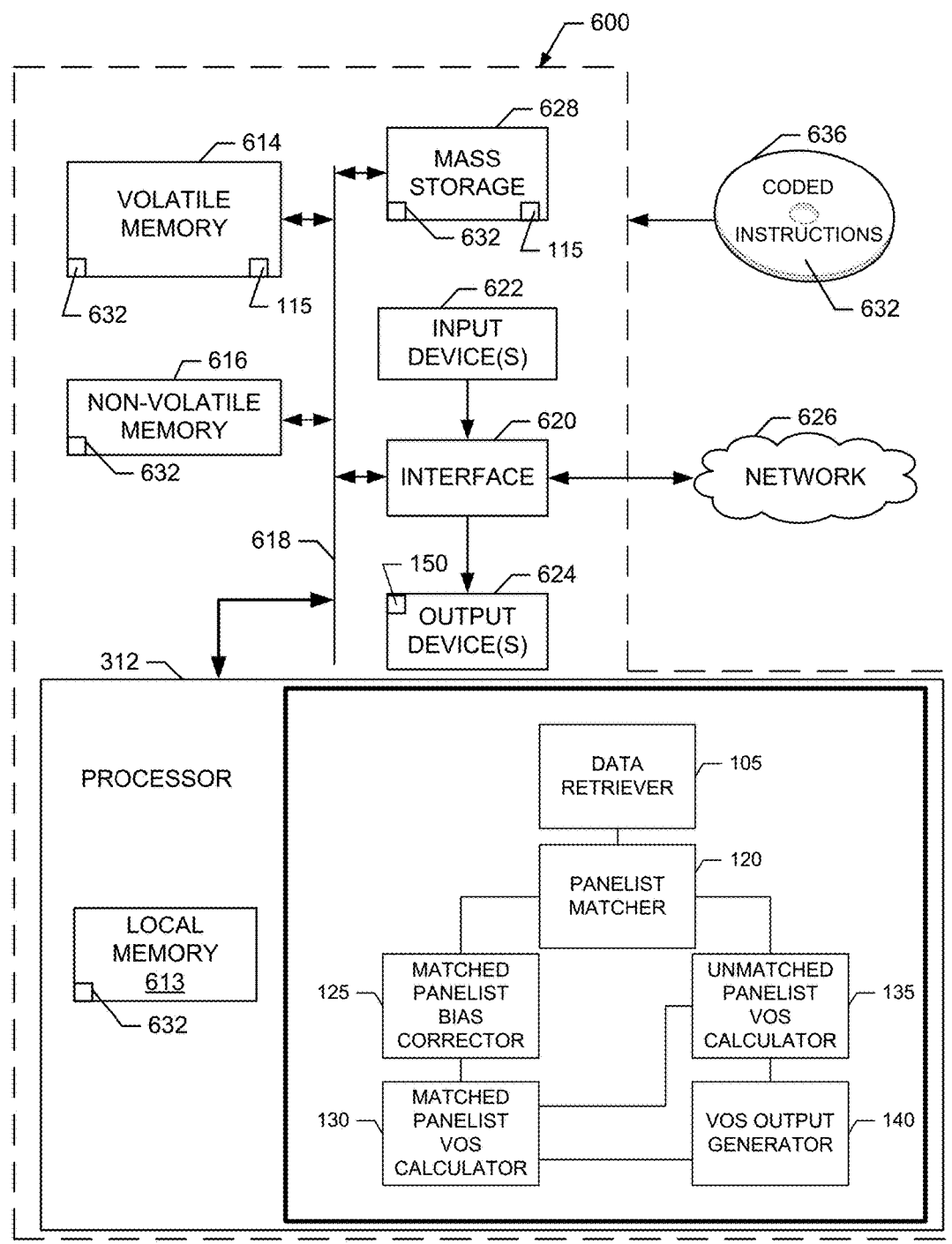
FIG. 6 is a block diagram of an example processor platform structured to execute the example computer readable instructions of FIGS. 3, 4 and/or 5 to implement the example television program volume of switching estimator of FIG. 1.

FIG. 6 is a block diagram of an example processor platform 600 capable of executing the instructions of FIGS. 3, 4 and/or 5 to implement the example VoS estimator 100 of FIG. 1. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. In the illustrated example of FIG. 6, the processor 612 is configured via example instructions 632, which include the example instructions of FIGS. 3, 4 and/or 5, to implement the example data retriever 105, the example panelist matcher 120, the example matched panelist bias corrector 125, the example matched panelist VoS calculator 130, the example unmatched panelist VoS estimator 135 and/or the example VoS output generator 140 of FIG. 1.

The processor 612 of the illustrated example includes a local memory 613 (e.g., a cache). The processor 612 of the illustrated example is in communication with a main memory including a volatile memory 614 and a non-volatile memory 616 via a link 618. The link 618 may be implemented by a bus, one or more point-to-point connections, etc., or a combination thereof. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 600, can allow the user to control the computer system and provide data to the computer using physical gestures, such as, but not limited to, hand or body movements, facial expressions, and face recognition.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor. In the illustrated example of FIG. 6, the output device(s) 624 implement the example output device 150 of FIG. 1.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID (redundant array of independent disks) systems, and digital versatile disk (DVD) drives. In some examples, the mass storage device 628 may implement the example panelist database 115 of FIG. 1. Additionally or alternatively, in some examples, the volatile memory 614 may implement the example panelist database 115 of FIG. 1

Coded instructions 632 corresponding to the instructions of FIGS. 3, 4 and/or 5 may be stored in the mass storage device 628, in the volatile memory 614, in the non-volatile memory 616, in the local memory 613 and/or on a removable tangible computer readable storage medium, such as a CD or DVD 636.

From the foregoing, it will be appreciated that example methods, apparatus and articles of manufacture have been disclosed that estimate volume of switching among television programs over two measurement periods of interest for an audience measurement panel. Unlike prior VoS analysis techniques, example VoS analysis techniques disclosed herein are able to utilize incomplete panelist viewing data in the VoS analysis. As such, example VoS analysis techniques disclosed herein improve VoS estimates by including panelists who are in the audience measurement panel for just a portion of the two measurement periods of interest.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to estimate volume of switching among television programs, the apparatus comprising:
   a matched panelist volume of switching calculator to determine, based on accessed panelist program viewing data, a first volume of switching value to represent a portion of a decreased amount of tuning by matched panelists to a first television program measured from a first measurement period to a second measurement period to attribute to an increased amount of tuning by the matched panelists to a second television program measured from the first measurement period to the second measurement period;
   an unmatched panelist volume of switching estimator to estimate, based on the accessed panelist program viewing data and the first volume of switching value, a second volume of switching value to represent a portion of a decreased amount of tuning by unmatched panelists to the first television program measured from the first measurement period to the second measurement period to attribute to an increased amount of tuning by the unmatched panelists to the second television program measured from the first measurement period to the second measurement period, wherein to estimate the second volume of switching value, the unmatched panelist volume of switching estimator is to:
      determine, based on the accessed panelist program viewing data, a first matched tuning value to represent an amount of tuning by the matched panelists to the first television program in the first measurement period;
      determine, based on the accessed panelist program viewing data, a second matched tuning value to represent an amount of tuning by the matched panelists to the second television program in the first measurement period;
      determine, based on the accessed panelist program viewing data, a first unmatched tuning value to represent an amount of tuning by the unmatched panelists to the first television program in the first measurement period;
   determine, based on the accessed panelist viewing data, a second unmatched tuning value to represent an amount of tuning by the unmatched panelists to the second television program in the first measurement period;
      determine a scale factor based on a square root of (i) a first ratio of the first unmatched tuning value to the first matched tuning value multiplied by (ii) a second ratio of the second unmatched tuning value to the second matched tuning value; and
      multiply the first volume of switching value by the scale factor to determine the second volume of switching value; and
   a volume of switching output generator to combine the first volume of switching value and the second volume of switching value to determine a third volume of switching value corresponding to a combination of the matched panelists and the unmatched panelists, the matched panelist volume of switching calculator, the unmatched panelist volume of switching estimator and the volume of switching output generator implemented by hardware or at least one processor.

2. The apparatus of claim 1, wherein the matched panelists correspond to a first group of panelists represented in the accessed panelist program viewing data for both the first and second measurement time periods, and the unmatched panelists correspond to a second group of panelists not represented in the accessed panelist program viewing data for at least one of the first or second measurement time periods.

3. The apparatus of claim 1, wherein the volume of switching output generator is further to output a volume of switching matrix including the third volume of switching value to represent a portion of a decreased amount of tuning by the combination of matched and unmatched panelists to the first television program from the first measurement period to the second measurement period to attribute to an increased amount of tuning by the combination of the matched and unmatched panelists to the second television program from the first measurement period to the second measurement period.

4. An apparatus to estimate volume of switching among television programs, the apparatus comprising:
   a matched panelist volume of switching calculator to determine, based on accessed panelist program viewing data, a first volume of switching value to represent a portion of a decreased amount of tuning by matched panelists to a first television program, measured from a first measurement period to a second measurement period, to attribute to an increased amount of tuning by the matched panelists to a second television program, measured from the first measurement period to the second measurement period;
   an unmatched panelist volume of switching estimator to estimate, based on the accessed panelist program viewing data and the first volume of switching value, a second volume of switching value to represent a portion of a decreased amount of tuning by unmatched panelists to the first television program, measured from the first measurement period to the second measurement period, to attribute to an increased amount of tuning by the unmatched panelists to the second television program, measured from the first measurement period to the second measurement period, wherein to estimate the second volume of switching value, the unmatched panelist volume of switching estimator is to:
      determine, based on the accessed panelist program viewing data, a first matched tuning value to represent an amount of tuning by the matched panelists to the first television program in the first measurement period;
      determine, based on the accessed panelist program viewing data, a second matched tuning value to represent an amount of tuning by the matched panelists to the second television program in the first measurement period;
      determine, based on the accessed panelist program viewing data, a first unmatched tuning value to represent an amount of tuning by the unmatched panelists to the first television program in the first measurement period;
      determine, based on the accessed panelist program viewing data, a second unmatched tuning value to represent an amount of tuning by the unmatched panelists to the second television program in the first measurement period;

determine a scale factor based on (i) a first ratio of the first unmatched tuning value to the first matched tuning value and (ii) a second ratio of the second unmatched tuning value to the second matched tuning value;

multiply the first volume of switching value by the scale factor; and solve for the second volume of switching value based on (i) a result of the first volume of switching value being multiplied by the scale factor, (ii) a first constraint that a first sum of volume of switching values representing tuning by the unmatched panelists from respective ones of a first set of programs, including the first television program, in the first measurement period to the second television program in the second measurement period equals the second unmatched tuning value, and (iii) a second constraint that a second sum of volume of switching values representing tuning by the unmatched panelists from the first television program in the first measurement period to respective ones of a second set of programs, including the second television program, in the second measurement period equals the first unmatched tuning value; and a volume of switching output generator to combine the first volume of switching value and the second volume of switching value to determine a third volume of switching value corresponding to a combination of the matched panelists and the unmatched panelists, the matched panelist volume of switching calculator, the unmatched panelist volume of switching estimator and the volume of switching output generator implemented by hardware or at least one processor.

5. A non-transitory computer readable storage medium comprising computer readable instructions which, when executed, cause a processor to at least:

determine, based on accessed panelist program viewing data, a first volume of switching value to represent a portion of a decreased amount of tuning by matched panelists to a first television program measured from a first measurement period to a second measurement period to attribute to an increased amount of tuning by the matched panelists to a second television program measured from the first measurement period to the second measurement period;

estimate, based on the accessed panelist program viewing data and the first volume of switching value, a second volume of switching value to represent a portion of a decreased amount of tuning by unmatched panelists to the first television program measured from the first measurement period to the second measurement period to attribute to an increased amount of tuning by the unmatched panelists to the second television program measured from the first measurement period to the second measurement period, wherein to estimate the second volume of switching value, the instructions, when executed, cause the processor to:

determine, based on the accessed panelist program viewing data, a first matched tuning value to represent an amount of tuning by the matched panelists to the first television program in the first measurement period;

determine, based on the accessed panelist program viewing data, a second matched tuning value to represent an amount of tuning by the matched panelists to the second television program in the first measurement period;

determine, based on the accessed panelist program viewing data, a first unmatched tuning value to represent an amount of tuning by the unmatched panelists to the first television program in the first measurement period;

determine, based on the accessed panelist program viewing data, a second unmatched tuning value to represent an amount of tuning by the unmatched panelists to the second television program in the first measurement period;

determine a scale factor based on a square root of (i) a first ratio of the first unmatched tuning value to the first matched tuning value multiplied by (ii) a second ratio of the second unmatched tuning value to the second matched tuning value; and multiply the first volume of switching value by the scale factor to determine the second volume of switching value; and combine the first volume of switching value and the second volume of switching value to determine a third volume of switching value corresponding to a combination of the matched panelists and the unmatched panelists.

6. The storage medium of claim 5, wherein the matched panelists correspond to a first group of panelists represented in the accessed panelist program viewing data for both the first and second measurement time periods, the unmatched panelists correspond to a second group of panelists not represented in the accessed panelist program viewing data for at least one of the first or second measurement time periods, and the instructions, when executed, further cause the processor to output a volume of switching matrix including the third volume of switching value to represent a portion of a decreased amount of tuning by the combination of matched and unmatched panelists to the first television program from the first measurement period to the second measurement period to attribute to an increased amount of tuning by the combination of the matched and unmatched panelists to the second television program from the first measurement period to the second measurement period.

7. A non-transitory computer readable storage medium computer readable instructions which, when executed, cause a processor to at least:

determine, based on accessed panelist program viewing data, a first volume of switching value to represent a portion of a decreased amount of tuning by matched panelists to a first television program, measured from a first measurement period to a second measurement period, to attribute to an increased amount of tuning by the matched panelists to a second television program, measured from the first measurement period to the second measurement period;

estimate, based on the accessed panelist program viewing data and the first volume of switching value, a second volume of switching value to represent a portion of a decreased amount of tuning by unmatched panelists to the first television program, measured from the first measurement period to the second measurement period, to attribute to an increased amount of tuning by the unmatched panelists to the second television program, measured from the first measurement period to the second measurement period, wherein to estimate the second volume of switching value, the instructions, when executed, cause the processor to:

determine, based on the accessed panelist program viewing data, a first matched tuning value to represent an amount of tuning by the matched panelists to the first television program in the first measurement period;

determine, based on the accessed panelist program viewing data, a second matched tuning value to represent an amount of tuning by the matched panelists to the second television program in the first measurement period;

determine, based on the accessed panelist program viewing data, a first unmatched tuning value to represent an amount of tuning by the unmatched panelists to the first television program in the first measurement period;

determine, based on the accessed panelist program viewing data, a second unmatched tuning value to represent an amount of tuning by the unmatched panelists to the second television program in the first measurement period;

determine a scale factor based on (i) a first ratio of the first unmatched tuning value to the first matched tuning value and (ii) a second ratio of the second unmatched tuning value to the second matched tuning value multiply the first volume of switching value by the scale factor; and solve for the second volume of switching value based on (i) a result of the first volume of switching value being multiplied by the scale factor, (ii) a first constraint that a first sum of volume of switching values representing tuning by the unmatched panelists from respective ones of a first set of programs, including the first television program, in the first measurement period to the second television program in the second measurement period equals the second unmatched tuning value, and (iii) a second constraint that a second sum of volume of switching values representing tuning by the unmatched panelists from the first television program in the first measurement period to respective ones of a second set of programs, including the second television program, in the second measurement period equals the first unmatched tuning value; and combine the first volume of switching value and the second volume of switching value to determine a third volume of switching value corresponding to a combination of the matched panelists and the unmatched panelists.

8. A method to estimate volume of switching among television programs, the method comprising:

determining, by executing an instruction with a processor and based on accessed panelist program viewing data, a first volume of switching value representing a portion of a decreased amount of tuning by matched panelists to a first television program measured from a first measurement period to a second measurement period to attribute to an increased amount of tuning by the matched panelists to a second television program measured from the first measurement period to the second measurement period;

estimating, by executing an instruction with the processor and based on the accessed panelist program viewing data and the first volume of switching value, a second volume of switching value representing a portion of a decreased amount of tuning by unmatched panelists to the first television program measured from the first measurement period to the second measurement period to attribute to an increased amount of tuning by the unmatched panelists to the second television program measured from the first measurement period to the second measurement period, wherein the estimating of the second volume of switching value includes:

determining, based on the accessed panelist program viewing data, a first matched tuning value representing an amount of tuning by the matched panelists to the first television program in the first measurement period;

determining, based on the accessed panelist program viewing data, a second matched tuning value representing an amount of tuning by the matched panelists to the second television program in the first measurement period;

determining, based on the accessed panelist program viewing data, a first unmatched tuning value representing an amount of tuning by the unmatched panelists to the first television program in the first measurement period;

determining, based on the accessed panelist program viewing data, a second unmatched tuning value representing an amount of tuning by the unmatched panelists to the second television program in the first measurement period;

determining a scale factor based on a square root of (i) a first ratio of the first unmatched tuning value to the first matched tuning value multiplied by (i) a second ratio of the second unmatched tuning value to the second matched tuning value; and multiplying the first volume of switching value by the scale factor to determine the second volume of switching value; and combining, by executing an instruction with the processor, the first volume of switching value and the second volume of switching value to determine a third volume of switching value corresponding to a combination of the matched panelists and the unmatched panelists.

9. The method of claim 8, wherein the matched panelists correspond to a first group of panelists represented in the accessed panelist program viewing data for both the first and second measurement time periods, and the unmatched panelists correspond to a second group of panelists not represented in the accessed panelist program viewing data for at least one of the first or second measurement time periods.

10. The method of claim 8, further including outputting a volume of switching matrix including the third volume of switching value to represent a portion of a decreased amount of tuning by the combination of matched and unmatched panelists to the first television program from the first measurement period to the second measurement period to attribute to an increased amount of tuning by the combination of the matched and unmatched panelists to the second television program from the first measurement period to the second measurement period.

11. A method to estimate volume of switching among television programs, the method comprising:

determining, by executing an instruction with a processor and based on accessed panelist program viewing data, a first volume of switching value representing a portion of a decreased amount of tuning by matched panelists to a first television program measured from a first measurement period to a second measurement period to attribute to an increased amount of tuning by the matched panelists to a second television program measured from the first measurement period to the second measurement period;

estimating, by executing an instruction with the processor and based on the accessed panelist program viewing data and the first volume of switching value, a second volume of switching value representing a portion of a decreased amount of tuning by unmatched panelists to the first television program measured from the first measurement period to the second measurement period to attribute to an increased amount of tuning by the unmatched panelists to the second television program measured from the first measurement period to the second measurement period, wherein the estimating of the second volume of switching value includes:

determining, based on the accessed panelist program viewing data, a first matched tuning value representing an amount of tuning by the matched panelists to the first television program in the first measurement period;

determining, based on the accessed panelist program viewing data, a second matched tuning value representing an amount of tuning by the matched panelists to the second television program in the first measurement period;

determining, based on the accessed panelist program viewing data, a first unmatched tuning value representing an amount of tuning by the unmatched panelists to the first television program in the first measurement period;

determining, based on the accessed panelist program viewing data, a second unmatched tuning value representing an amount of tuning by the unmatched panelists to the second television program in the first measurement period;

determining a scale factor based on (i) a first ratio of the first unmatched tuning value to the first matched tuning value and (ii) a second ratio of the second unmatched tuning value to the second matched tuning value;

multiplying the first volume of switching value by the scale factor; and solving for the second volume of switching value based on (i) a result of the multiplying of the first volume of switching value by the scale factor, (ii) a first constraint that a first sum of volume of switching values representing tuning by the unmatched panelists from respective ones of a first set of programs, including the first television program, in the first measurement period to the second television program in the second measurement period equals the second unmatched tuning value, and (iii) a second constraint that a second sum of volume of switching values representing tuning by the unmatched panelists from the first television program in the first measurement period to respective ones of a second set of programs, including the second television program, in the second measurement period equals the first unmatched tuning value; and combining, by executing an instruction with the processor, the first volume of switching value and the second volume of switching value to determine a third volume of switching value corresponding to a combination of the matched panelists and the unmatched panelists.

\* \* \* \* \*